(12) United States Patent
Gamble, II et al.

(10) Patent No.: US 7,431,227 B2
(45) Date of Patent: Oct. 7, 2008

(54) MOUNTING ASSEMBLY FOR REMOVABLY MOUNTING A HOPPER SPREADER TO A VEHICLE

(75) Inventors: Robert N. Gamble, II, Watertown, WI (US); Lynn W. Schultz, Campbellsport, WI (US); Terry C. Wendorff, Slinger, WI (US)

(73) Assignee: Sno-Way International, Inc., Hartford, WI (US)

(*) Notice: Subject to any disclaimer, the term of this patent is extended or adjusted under 35 U.S.C. 154(b) by 413 days.

(21) Appl. No.: 11/144,336

(22) Filed: Jun. 3, 2005

(65) Prior Publication Data

US 2006/0273105 A1    Dec. 7, 2006

(51) Int. Cl.
*A01C 3/06* (2006.01)
*A01C 7/08* (2006.01)
*A01C 15/00* (2006.01)
*B67D 5/06* (2006.01)
*E01C 19/20* (2006.01)

(52) U.S. Cl. .................. 239/651; 222/181.1; 222/185.1

(58) Field of Classification Search ................. 239/681, 239/668, 651, 659, 669, 670, 679, 684, 650, 239/687; 222/185.1, 181.1, 504; 111/52–65, 111/134–138, 925
See application file for complete search history.

(56) References Cited

U.S. PATENT DOCUMENTS

| 5,375,773 | A | 12/1994 | Lewis |
| 5,947,391 | A | 9/1999 | Beck |
| 5,988,534 | A | 11/1999 | Kost |
| 6,089,478 | A | 7/2000 | Truan |
| 6,220,532 | B1 | 4/2001 | Manon |
| 6,702,208 | B1 | 3/2004 | Hadler |

*Primary Examiner*—Christopher J. Novosad
(74) *Attorney, Agent, or Firm*—Reinhart Boerner Van Deuren s.c.

(57) ABSTRACT

A mounting assembly for removably mounting a hopper spreader to a trailer hitch of a vehicle includes an elongated mounting bar adapted to be secured to the hopper spreader and a hitch adapter carried by the mounting bar which is adapted to be received by the trailer hitch for supporting the hopper spreader on the vehicle. A stabilizing assembly carried by the mounting bar includes stabilizing arms that extend outwardly on opposite sides of the hitch adapter for engaging an undersurface of the vehicle for stabilizing the hopper spreader against rotation about the trailer hitch.

20 Claims, 5 Drawing Sheets

MOUNTING ASSEMBLY FOR REMOVABLY MOUNTING A HOPPER SPREADER TO A VEHICLE

BACKGROUND OF THE INVENTION

Field of the Invention

This invention relates to hopper spreaders for spreading dry, free flow materials, and more particularly, to a mounting assembly for removably mounting a hopper spreader to a vehicle.

The spreading of salt and/or sand is a requirement in many areas for maintaining roads and driveways during the winter months. Various types of hopper spreader units have been developed for spreading dry, free flow materials, such as salt and sand. Many salt/sand hopper spreader units have been designed for mounting on vehicles such as pick-up trucks, because of the availability of pick-up trucks to those who are involved in road and driveway maintenance.

Because hopper spreader units are not used year round, the salt spreader units are removably mounted on the pick-up truck. Typically, the hopper spreader unit is mounted on the rear of the pick-up truck using a frame that slides over or is otherwise secured to the tailgate back of vehicle and is supported on the bumper of the vehicle. One problem associated with mounting a hopper spreader unit on the rear of a pick-up truck is accessing of the vehicle's cargo bed via the tailgate. Various attempts have been made to improve mounting of such hopper spreader units, including the development of swing-out mounting assemblies. Problems with swing-out hopper spreader units include damage to the hopper spreader unit and/or the vehicle when a loaded hopper spreader unit is pivoted. Other considerations include the time that is required to install a hopper spreader unit on a vehicle and the damage done to the vehicle when the hopper spreader unit is installed. For example, the vehicle bumper may be scratched or damaged if the frame of the hopper spreader is mounted on or otherwise connected to the bumper.

The mounting bracket must be bolted to the top and/or the side wall of the vehicle. This requires that bolt holes be drilled into the top of each of the side walls to secure the bracket to the top of the side walls. The bolt holes permanently disfigure the vehicle and result in rusting of the vehicle around the drilled bolt holes. Also, the outer surface of the tail gate can be damaged if the unit is mounted over the tail gate.

In another known arrangement, a hopper spreader unit is mounted to the vehicle using the existing trailer hitch on the vehicle. In this arrangement, a trailer hitch adapter attached to the frame of the hopper spreader unit includes a tube dimensioned to be received in an opening of the vehicle trailer hitch. The tube of the hitch adapter and the opening of the trailer hitch are rectangular in shape to resist rotation of the hopper spreader unit relative to the vehicle. However, due to the size and shape of the hopper of the hopper spreader unit, there is a tendency for the hopper spreader to rotate or wobble about an axis defined by the axis of the trailer hitch, allowing the hopper to pivot about the trailer hitch.

It is accordingly the primary objective of the present invention that it provide an improved mounting assembly for removably mounting a hopper spreader to a vehicle.

It is another objective of the present invention that it provide a mounting assembly for removably mounting a hopper spreader to a vehicle using the trailer hitch of the vehicle and which prevents the hopper spreader from pivoting about the trailer hitch.

The mounting assembly of the present invention must also be of construction which is both durable and long lasting, and it should also require little or no maintenance to be provided by the user throughout its operating lifetime. In order to enhance the market appeal of the mounting assembly of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention which provides a mounting assembly for removably mounting to a vehicle a hopper spreader of the type used for dispensing dry, free flow material.

In accordance with the invention, the mounting assembly includes an elongated mounting bar adapted to be secured to the hopper spreader and a mounting adapter carried by the mounting bar. The mounting adapter is located intermediate the ends of the mounting bar for coupling the mounting bar to a trailer hitch of the vehicle. A stabilizing assembly carried by the mounting bar is adapted to engage an undersurface of the vehicle on opposite sides of the mounting adapter for stabilizing the hopper spreader against rotation relative to the vehicle.

The stabilizing assembly includes at least first and second stabilizer assemblies, each including at least one stabilizing member and an adjustment mechanism. The stabilizing member is mounted for pivoting movement relative to the mounting bar. The adjustment mechanism is adapted for pivoting the stabilizing member relative to the mounting member between a stabilizing position in which the stabilizing member engages an undersurface of the vehicle, such as the vehicle bumper or some other surface, and a release position. The stabilizing member can include cushioning material disposed on a contact surface that engages the vehicle bumper or other surface, for preventing the surface from being scratched or damaged.

In a preferred embodiment, the mounting bar includes first and second beams. The hopper spreader is coupled to the first beam and the hitch adapter is coupled to the second beam. The first and second beams are releasably coupled together at least at one end by a pivot, allowing the hopper spreader to be pivoted with respect to the second beam between a first, or use position in which the hopper spreader is positioned for spreading operations, and a second or access position, in which the hopper spreader is pivoted away from the vehicle on which it is mounted, allowing access to the rear of the vehicle. The first and second beams can nest together when the first beam is in the use position. Alternatively, the first and second beams can be releasably coupled together at opposite ends by first and second pivots, allowing the hopper spreader to be pivoted about either end of the second beam.

It may therefore be seen that the present invention teaches a mounting assembly for removably mounting a hopper spreader to a vehicle. The mounting assembly includes an elongated mounting bar adapted to be secured to the hopper spreader, a hitch adapter carried by the mounting bar, and a stabilizing assembly carried by the mounting bar. The hitch adapter is received by a trailer hitch of the vehicle. The stabilizing assembly includes stabilizing arms that are adapted to engage an undersurface of the vehicle on opposite sides of the hitch adapter for stabilizing the hopper spreader against rotation relative to a vehicle on which the hopper spreader is installed.

The mounting assembly of the present invention is of a construction which is both durable and long lasting, and which will require little or no maintenance to be provided by the user throughout its operating lifetime. The mounting assembly of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
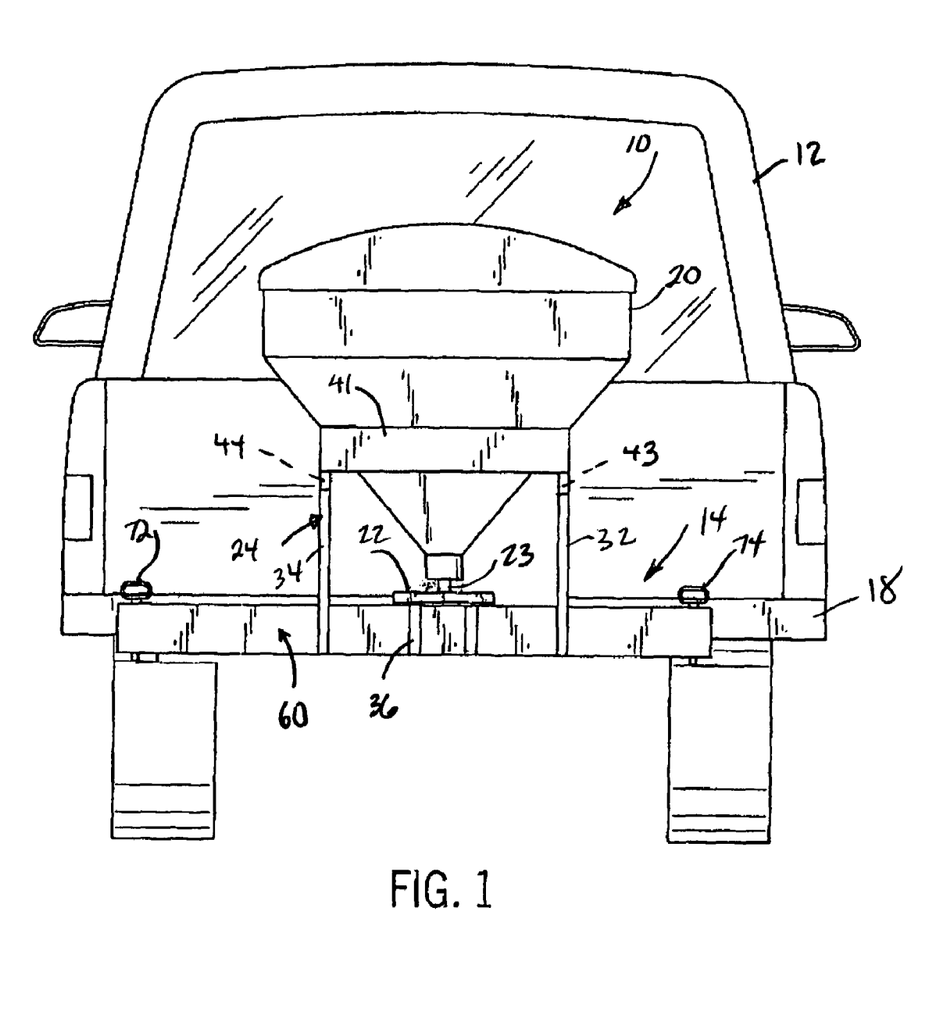
FIG. 1 illustrates a hopper spreader mounted to the rear of a vehicle by the mounting assembly provided in accordance with the invention.
Figure 2:
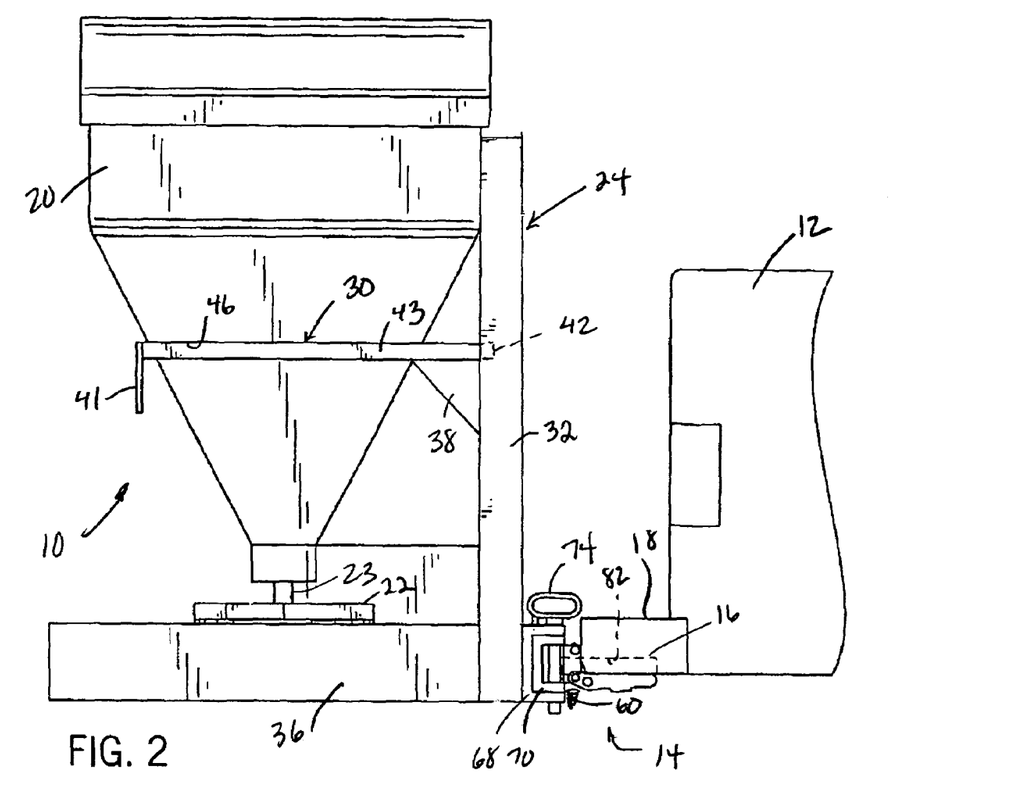
FIG. 2 is a side elevation view showing the hopper spreader and the mounting assembly of the present invention mounted on a vehicle in the manner shown in FIG. 1.

Referring to FIGS. 1 and 2 of the drawings, there is shown a hopper spreader 10 mounted to a vehicle 12 by a mounting assembly 14 provided by the present invention. The mounting assembly 14 is adapted for mounting the hopper spreader 10 to vehicles that have a conventional trailer hitch 16 located at the rear of the vehicle. Such trailer hitches commonly are located below and behind the rear bumper 18 of the vehicle. The mounting assembly 14 allows the hopper spreader 10 to be mounted to the vehicle without requiring that holes be formed in the tailgate, sidewalls or bed of the vehicle, and/or without requiring that the mounting assembly be slid over the tailgate or sidewalls of the vehicle during mounting of the hopper spreader on the vehicle.

The mounting assembly 14 is described herein with reference to a preferred embodiment for mounting a hopper spreader 10 on a pickup truck 12. However, the mounting assembly 14 can be used to mount a hopper spreader apparatus 10 on any other type of vehicle that has a trailer hitch available. Such vehicles can include, but are not limited to, highway trucks and the like, if such vehicles are equipped with a trailer hitch or other similar mounting adapter.

In a non-limiting example, the hopper spreader 10 is described with reference to an application for spreading dry, free flow material, such as salt, sand and the like, onto a surface being traveled by a vehicle to which the hopper spreader 10 is mounted. However, the hopper spreader 10 can be used for spreading other particulate materials such as seed, fertilizer, or any other free flowing material. Moreover, the mounting assembly can be used to removably mount a sprayer apparatus, similar to the hopper spreader, on a vehicle, for dispensing liquid material. In such applications, the hopper spreader (or sprayer) can be mounted on vehicles, such as tractors or farm wagons, if such vehicles are equipped with a trailer hitch or other similar mounting adapter.

The hopper spreader 10 includes a hopper 20 for containing the dry, free flow material to be spread and a spinner 22 located beneath a discharge outlet of the hopper 20. The spinner 22 can be carried on a shaft 23 that is rotated by a drive assembly (not shown) to spread dry free flow material being discharged from the hopper 20. The hopper, the spinner 22 and the drive assembly can be supported on the mounting assembly 14 by a support frame 24.

Referring to FIGS. 1-3 and 5, the support frame 24 includes an open frame assembly 30, a pair of upright members 32 and 34, and a support beam 36. The upright members 32 and 34 have lower ends connected to a swing bar assembly 60 of the mounting assembly 14 and extend upward vertically from the swing bar assembly 60, supporting the open frame assembly 30 above the support beam 36. The open frame assembly 30 receives and supports the hopper 20. The open frame assembly 30 includes a front cross member 41 and a rear cross member 42 (FIG. 5) that are interconnected at opposite ends by a pair of horizontal side members 43 and 44, side member 44 being shown in phantom in FIG. 1. The support frame 24 can include gussets 38, including gussets connected between the side members 43 and 44 of the open frame assembly 30 and the upright members 32 and 34, for example, for strengthening the support frame 24. The hopper 20 includes shoulders, such as shoulder 46 shown in FIG. 2, extending along opposite sides of the hopper 20, each of which rests on different one of the side members 43 and 44, to support the hopper 20 near the upper end of the hopper.

The support beam 36 extends beneath the spinner 22 and journals the lower end of the drive shaft 23 for the spinner 22. The support beam 36 extends rearwardly from the base member 30 as shown in FIG. 2, for example, and can be connected to an outer beam 68 of the swing bar assembly 60 in any suitable way, such as by fasteners, indicated by reference number 75, which can be fasteners, such as bolts and nuts, as illustrated in the drawings, or by welding.

Figure 3:
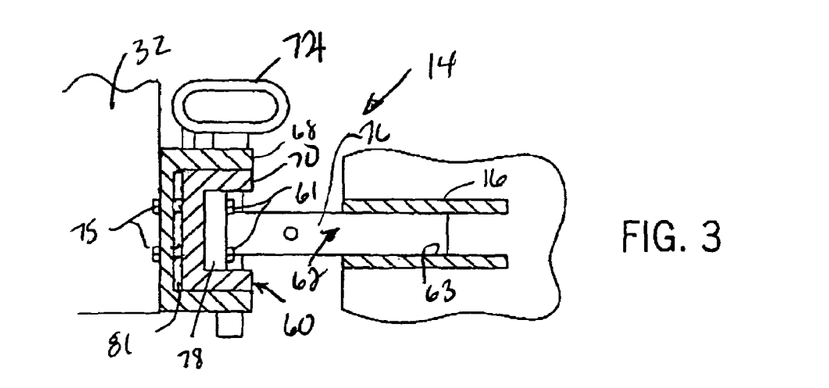
FIG. 3 is an enlarged fragmentary view showing a hitch adapter tube of the mounting assembly received in a trailer hitch of the vehicle.
Figure 4:
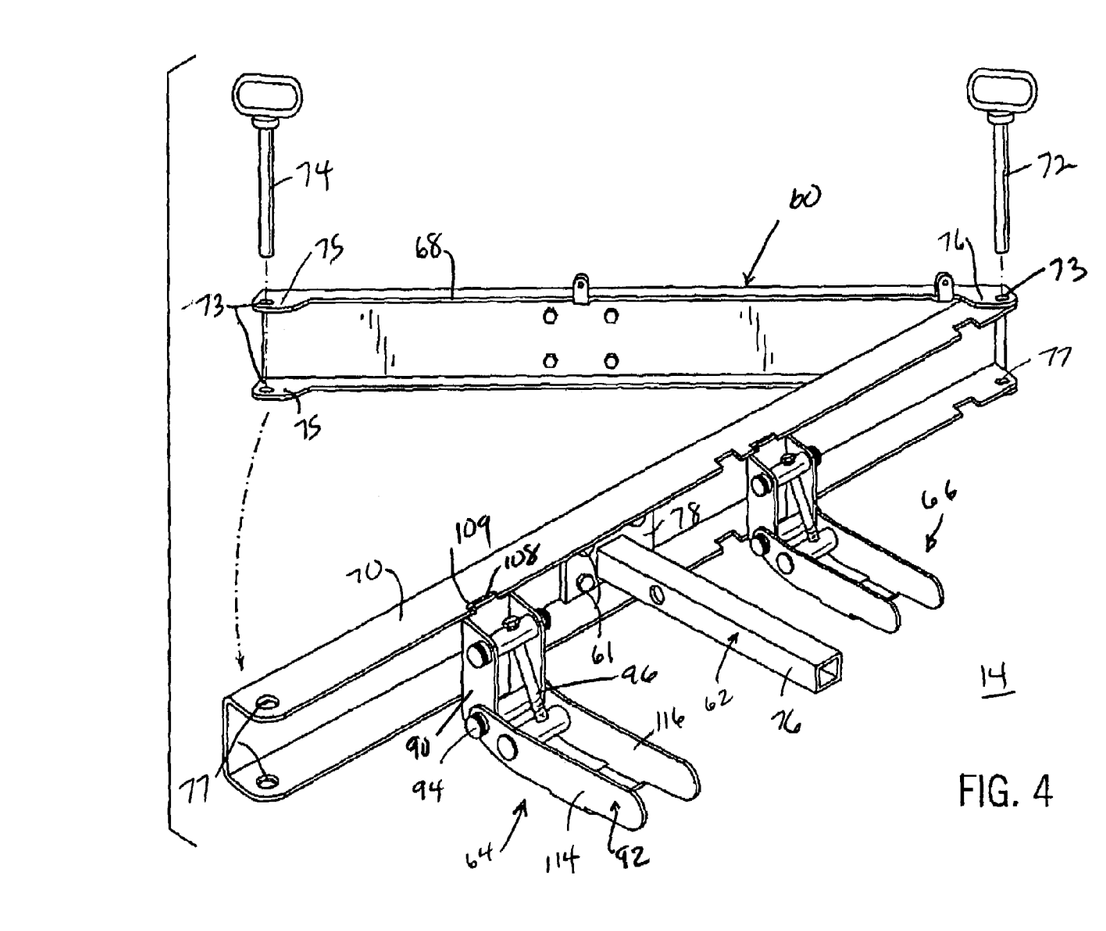
FIG. 4 is a perspective view of the mounting assembly of the present invention, with an outer beam shown pivoted about an inner beam to an access position.
Figure 5:
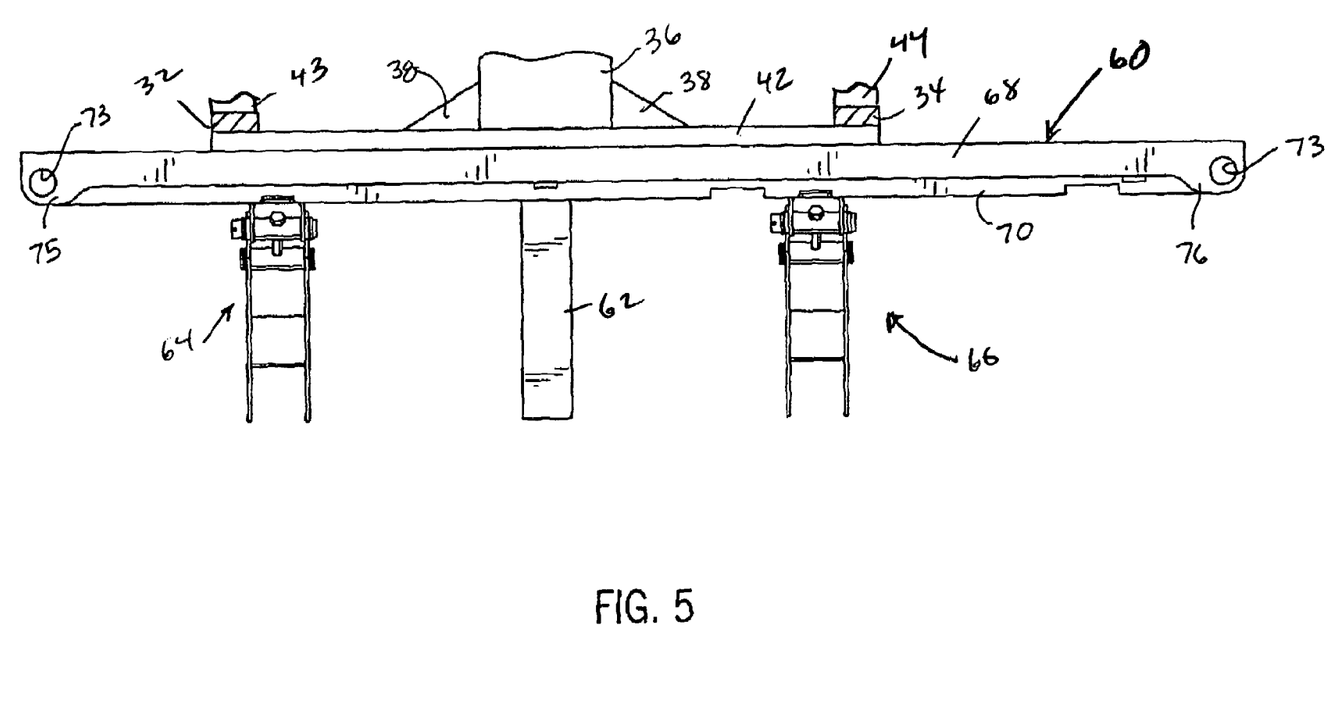
FIG. 5 is a top plan view of the mounting assembly of the present invention, with the inner and outer beams shown nested.

Referring to FIGS. 3-5, the mounting assembly 14 includes the swing bar assembly 60, a hitch adapter 62 and stabilizer assemblies 64 and 66 which are located on the right and left hand sides of the mounting assembly as viewed in FIG. 1. The swing bar assembly 60 includes the outer beam 68 and an inner beam 70. Although the mounting assembly 14 includes only two stabilizer assemblies, it is apparent that the mounting assembly can include more than two stabilizer assemblies.

The hitch adapter 62 couples the mounting assembly to the trailer hitch 16 of the vehicle. The hitch adapter 62 includes a hitch tube 76 with a mounting flange 78 at one end to facilitate securing the hitch adapter 62 to the inner beam 70. The mounting flange 78 includes mounting holes to allow the hitch adapter 62 to be removably attached to the inner beam 70 by fasteners, indicated by reference number 61, which can be nuts and bolts for example. Alternatively, the hitch adapter 62 can be secured to the inner beam 70 by welding.

The hitch tube 76 is generally rectangular in cross section and is dimensioned to be received in the rectangular opening 63 (FIG. 2) of a conventional trailer hitch. The hitch tube 76 is of a strong inflexible material, such as steel, and is of sufficient length to support the hopper spreader 10 spaced rearwardly of the vehicle tailgate at the rear of the vehicle. As shown in FIGS. 4 and 5, for example, the hitch adapter 62 is mounted on the swing bar assembly 60 offset with respect to the center of the swing bar assembly 60.

The inner beam 70 is pivotally mounted to the outer beam 68 by pull pins 72 and 74 that are located at opposite ends of the beams. Referring to FIG. 1, because the hitch adapter 62 is offset relative to the center of the swing bar assembly 60. When the mounting assembly 14 is mounted on a vehicle, the pivot formed by pull pin 72 is located near the end of the bumper 18 at the left-hand side of the vehicle while the pivot formed by pull pin 74 is located spaced inwardly from the right-hand end of the bumper. The outer beam 68 can be pivoted relative to the inner beam 70 about pull pin 72 at one end by removing the pull pin 74 at the opposite end or pivoted about pull pin 74 by removing the pull pin 72. In one embodiment, the beams 68 and 70 are generally C-shaped and the beams 68 and 70 are dimensioned to nest together.

Referring to FIGS. 4 and 5, the pull pins 72 and 74 extend through aligned apertures 73 in the outer beam 68 and aligned apertures 77 in the inner beam 70, the pull pins defining pivot points at opposite ends of the swing bar assembly 60. The apertures 73 are located in forwardly projecting ears 75 and 76 on the outer beam 68 such that the inner surface of the outer beam 68 is spaced apart from the outer surface of the inner beam 70 when the beams are nested, defining a cavity 81 as shown in FIG. 3, to facilitate pivoting of the outer beam 68 relative to the inner beam 70. In addition, the cavity 81 provides clearance for the fasteners 75 that connect the uprights, such as upright 32, to the outer beam 68 and the fasteners 61 that connect the hitch adapter 62 to the inner beam 70.

The right stabilizer assembly 64 and the left stabilizer assembly 66 are identical in structure and function and accordingly, only the stabilizer assembly 64 is described in detail. The stabilizer assembly 64 includes a base 90, a stabilizing member 92, a pivot 94 and an adjustment mechanism 96. The pivot pin 94 pivotably couples the stabilizing member 92 to the base 90. The adjustment mechanism 96 couples the stabilizing member 92 to the base 90.

Figure 6:
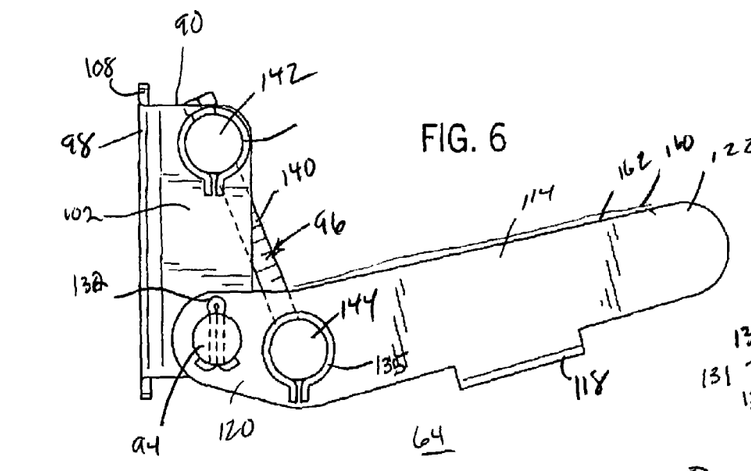
FIG. 6 is a side elevation view of a stabilizer assembly of the mounting assembly shown in FIG. 5.
Figure 7:
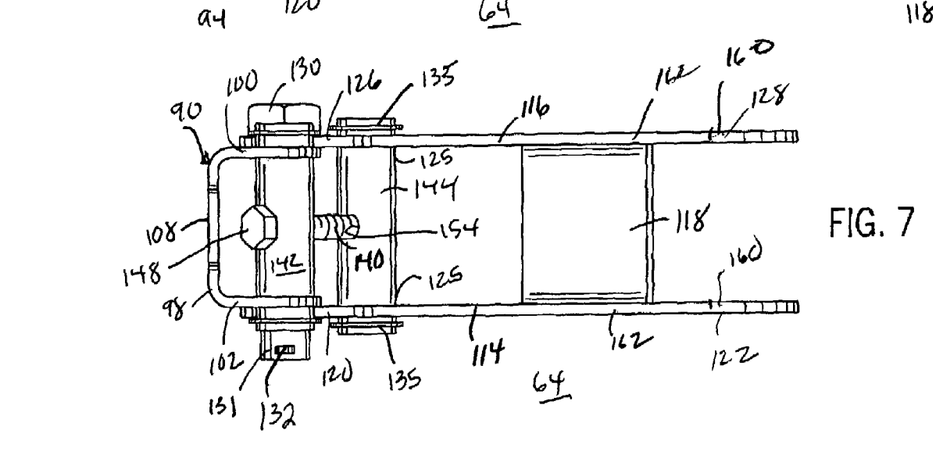
FIG. 7 is a top plan view of the stabilizer assembly of FIG. 6.
Figure 8:
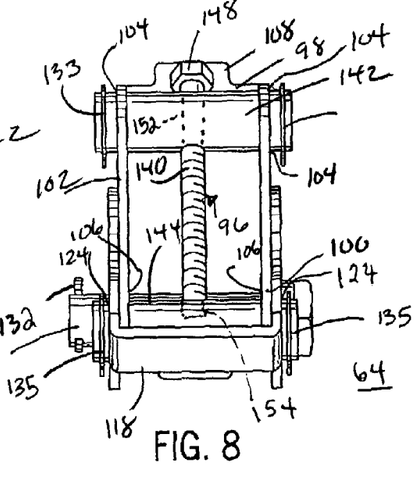
FIG. 8 is a front elevation view of the stabilizer assembly of FIG. 6.

Referring to FIGS. 6-8, the base 90 is a generally U-shaped member, includes a mounting portion 98, generally rectangular in shape, and sides 100 and 102, each of which is generally rectangular in shape. The upper ends of the sides 100 and 102 have axially aligned apertures 104 (FIG. 8), and the lower ends of the sides 100 and 102 have axially aligned apertures 106 (FIG. 8). The base 90 is connected to the inner beam 70. The base 90 includes an upwardly projecting lug 108 that mates with an opening 109 (FIG. 4) in the inner beam 70 to index the stabilizer assembly 64 to the inner beam 70. The stabilizer assemblies 64 and 66 can be attached to the inner beam 70 in any suitable manner, such as by welding, or with mechanical fasteners. Alternatively, the stabilizer assemblies 64 and 66 can employ a common base with the stabilizing member pivoted to the base and pivotable by a separate adjustment mechanism or by a common adjustment mechanism.

The stabilizing member 92 includes a stabilizing arm 114, a stabilizing arm 116 and a web portion 118. The stabilizing arms 114 and 116 are generally flat and are interconnected by the generally flat web portion 118. The stabilizing arm 114 has a mounting end 120 and a support end 122. The stabilizing arm 116 can be identical in size and shape to the stabilizing arm 114 and has a mounting end 126 and a support end 128. The mounting ends 120 and 126 of the stabilizing arms 114 and 116 have axially aligned apertures 124 in respective mounting ends 120 and 126 which are aligned with apertures 106 in the sides 100 and 102. Also, the mounting ends 120 and 126 have aligned apertures 125 (FIG. 7).

The pivot pin 94 includes a head 130 and a shank 131. The shank 131 extends through the apertures 124 in the stabilizing arms 114 and 116 and apertures 106 in the sides 100 and 102 of the base 92. The pivot pin 94 is held in place by the head 130 at one end and by a suitable retaining device, such as a cotter pin 132, at the opposite end. The pivot pin 94 allows pivoting movement of the stabilizing member 92 relative to the base 90 between a stabilizing position, shown in FIG. 2, and a release position. When in the stabilizing position, the stabilizing member 92 engages the undersurface of the bumper 18 (FIG. 2), locking the mounting assembly 14 and the hopper spreader against rotational movement relative to the vehicle, preventing the hopper from pivoting about the trailer hitch 16. In the release position, the stabilizing member 92 is lowered out of engagement with the bumper 18 to allow the hopper spreader to be removed from the vehicle.

Referring to FIGS. 4 and 6-8, the adjustment mechanism 96 includes an adjustable member 140, an upper pin 142 and a lower pin 144. The upper pin 142 and the lower pin 144 are rod-like members, generally cylindrical in shape. The upper pin 142 has an aperture 152 formed therethrough. The lower pin 144 has a tapped hole 154. The upper pin 142 extends through the axially aligned apertures 104 in the upper ends of the sides 100 and 102 and is held in place by retaining rings 133 that are received in annular grooves in opposite ends of the upper pin 142. Similarly, the lower pin 144 extends through the axially aligned apertures 125 in the mounting portions 120 and 126 of stabilizing arms 114 and 116 and is held in place by retaining rings 135 that are received in annular grooves formed in opposite ends of the lower pin 144.

The adjustable member 96 is a rod-like member having an upper end 148 coupled to the base 90 by the upper pin 142 and a lower end 150 coupled to the stabilizing member 92 by the lower pin 144. The upper end 148 of the adjustable member 140 extends though the aperture 152 formed through the upper pin 142. The lower end of the adjustable member 96 is threadingly received in the tapped hole 154 in the lower pin 144. In a non-limiting example, the adjustable member 140 can be a hex bolt, allowing the adjustable member to be turned using a wrench, or other suitable tool.

With the threaded end 150 threadingly engaging the tapped hole 152 in the lower pin 144, rotating or turning the adjustable member 140 in one direction pivots the stabilizing member 92 about the pivot pin 94, moving the free ends of the stabilizing arms 114 and 116 to the stabilizing position in engagement with the undersurface of the bumper 18. Similarly, rotating or turning the adjustable member 140 in the opposite direction pivots the stabilizing member 92 in the opposite direction about the pivot pin 94, lowering the free ends of the stabilizing arms 114 and 116 toward the release position.

The upper surfaces 160 of the sides 114 and 116 can include a cushioning material 162 to prevent scratching the undersurface of the bumper 28. The cushioning material 162 can be rubber or a relatively thick coating of a material, such as Teflon material or other non-scratching material. The cushioning material 162 can coat the upper surfaces 160 of the stabilizing arms 114 and 116. In an alternative assembly, the stabilizing arms 114 and 116 can be coated with the cushioning material.

To assemble the stabilizer assembly 64, the upper pin 142 is mounted on the base 90 and the lower pin 144 is mounted on the stabilizing member 92. The upper pin 142 is passed through the apertures 104 in the base 90 and the retaining rings 133 are applied to retain the upper pin 142 on the base 90. The lower pin 144 is passed through the apertures 125 in the stabilizing arms 114 and 116 and the retaining rings 135 are applied to retain the lower pin 144 on the stabilizing member 92. Then, the stabilizing arms 114 and 116 are positioned such that the mounting ends 120 and 126 straddle the sides 100 and 102 of the base 90. The apertures 124 in the stabilizing arms 114 and 116 are aligned with the apertures 106 in the base 90 and the pivot 94 is inserted through the aligned apertures and retained in place by inserting the cotter pin 132. Then, the shank 131 of the adjustable member 92 is passed through the aperture 152 through the upper pin 142 and the threaded end 150 of the adjustable member is threaded into the tapped hole 154 in the lower pin 144.

The stabilizer assemblies 64 and 66 can be attached to the inner beam 70 in any suitable manner, such as by welding, or with mechanical fasteners. Preferably, the stabilizing arms 114 and 116 are mounted onto the base member 90 after the base member 90 has been welded to the inner beam 70. However, the stabilizing member can be mounted on the base member 90 prior to attaching the base member 90 to the inner beam 54.

In mounting the hopper spreader 10 on a vehicle using the mounting assembly 14 of the present invention, the mounting assembly 14 is fully assembled as shown in FIGS. 4 and 5, but with the inner beam 70 locked to the outer beam 68. With the stabilizer assemblies 64 and 66 in the released position, the hopper spreader 10 is mounted on the vehicle by inserting the hitch tube 76 into the opening 63 of the trailer hitch 16 and sliding the hitch tube 76 into the trailer hitch.

Then, the stabilizer assemblies 64 and 66 are deployed by tightening the hex head bolts 140 to raise the distal ends of the stabilizing arms 114 and 116 upwardly into engagement with the underside of the bumper 18 of the vehicle 12. After the hopper spreader 10 is stabilized on the vehicle 12, removing either one of the pull pins 72 or 74, such as pull pin 72, allows the hopper spreader 10 to be swung out to an access position, pivoting the outer beam 68 relative to the inner beam 70 about the other pull pin 74, providing access to the tailgate at the rear of the truck. The particulate material to be spread can be stored in the cargo area of the truck. When access to the rear of the truck is no longer needed, the hopper spreader 10 can be swung back into position and the pull pin replaced to secure the outer beam 68 in locked engagement with the inner beam 70.

It may therefore be appreciated from the above detailed description of the preferred embodiment of the present invention that it provides a mounting assembly for removably mounting a hopper spreader to a vehicle. The mounting assembly includes an elongated mounting bar adapted to be secured to the hopper spreader apparatus, a hitch adapter carried by the mounting bar, and a stabilizing assembly carried by the mounting bar. The hitch adapter is received by a trailer hitch of the vehicle. The stabilizing assembly includes a stabilizing member that extends outwardly on opposite sides of the hitch adapter for engaging an undersurface of the vehicle for stabilizing the hopper spreader against rotation relative to a vehicle on which the hopper spreader is installed.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A mounting assembly for removably mounting a hopper spreader to a rear trailer hitch of a vehicle, said mounting assembly comprising:
   an elongated, substantially horizontal mounting bar positioned adjacent to and substantially parallel with a rear bumper of the vehicle, said elongated mounting bar adapted to be secured to the hopper spreader;
   a mounting adapter carried by said mounting bar, said mounting adapter located intermediate first and second ends of said mounting bar and sized to couple said mounting bar to the rear trailer hitch of the vehicle; and
   a stabilizing assembly carried by said mounting bar, said stabilizing assembly adapted to engage an undersurface of the vehicle on opposite sides of the trailer hitch for stabilizing the hopper spreader against rotation relative to the vehicle while the hopper spreader is mounted on the vehicle.

2. The mounting assembly according to claim 1, wherein said stabilizing assembly includes first and second stabilizer assemblies carried by said mounting bar, said first and second stabilizer assemblies located on said mounting bar on opposite sides of said mounting adapter.

3. The mounting assembly according to claim 2, wherein each of said stabilizer assemblies includes at least one stabilizing member mounted for pivoting movement relative to said mounting bar, and an adjustment mechanism for moving said stabilizing member relative to said mounting bar between a stabilizing position in which said stabilizing member engages said undersurface of the vehicle and a release position.

4. The mounting assembly according to claim 3, wherein each of said first and second stabilizer assemblies includes a base member for mounting to said mounting bar, said stabilizing member being cantilever mounted to said base member.

5. The mounting assembly according to claim 4, wherein said adjustment mechanism includes a rod-shaped member coupled between said stabilizing member and said base member for pivoting said stabilizing member relative to said base member.

6. The mounting assembly according to claim 3, wherein said stabilizing member includes an upper surface, and cushioning material disposed on said upper surface.

7. The mounting assembly according to claim 1, wherein said mounting bar includes first and second beams, and wherein one of said beams is pivotably coupled to said other beam.

8. The mounting assembly for a according to claim 7, wherein said first and second beams are coupled together at opposite ends by pivots, said second beam pivotable with respect to said first beam about said opposite ends.

9. The mounting assembly according to claim 7, wherein said first and second beams are adapted to nest together.

10. A mounting assembly for removably mounting a hopper spreader to a vehicle, said mounting assembly comprising:
    an elongated mounting bar adapted to be secured to the hopper spreader;
    a trailer hitch adapter on said mounting bar located intermediate first and second ends of said mounting bar; and
    first and second stabilizer assemblies carried by said mounting bar, said first and second stabilizer assemblies located on opposite sides of said trailer hitch adapter;
    said stabilizer assemblies each including at least one stabilizing member coupled to said mounting bar and projecting outwardly away from said mounting bar, and an adjustment mechanism adapted for pivoting said at least one stabilizing member relative to said mounting bar, said at least one stabilizing member adapted to be pivoted into engagement with an undersurface of the vehicle for stabilizing the hopper spreader against rotation relative to the vehicle while the hopper spreader is mounted on the vehicle;

wherein each of said stabilizer assemblies further includes a base member mounted to said mounting bar, said at least one stabilizing member being pivotally mounted to said base member, said adjustment mechanism coupling said stabilizing member to said base member, and wherein said adjustment mechanism is operable to pivot said stabilizing member relative to said base member.

11. The mounting assembly according to claim 10, wherein said at least one stabilizing member is cantilever mounted to said base member.

12. The mounting assembly according to claim 11, wherein said adjustment mechanism includes a rod-shaped member coupled between said at least one stabilizing member and said base member for pivoting said at least one stabilizing member relative to said base member.

13. The mounting assembly according to claim 10, wherein said mounting bar includes first and second beams coupled together at least at one end by a pivot to allow said first beam to pivot with respect to said second beam between first and second positions, and wherein said first and second beams nest when said first beam is in the first position.

14. The mounting assembly according to claim 13, wherein said first and second beams are generally C-shaped, said first and second beams releasably connected together at opposite ends by first and second pivots.

15. The mounting assembly according to claim 10, wherein said at least one stabilizing member includes a cushioning material on a contact surface for protecting the bumper engaged by a contact surface.

16. A mounting assembly for removably mounting a hopper spreader to a trailer hitch positioned on a rear end of a vehicle, said mounting assembly comprising:

a horizontally oriented mounting member including first and second beams interconnected at least at one end by a pivot, allowing said first beam to pivot with respect to said second beam between first and second positions, said first beam secured to a frame of the hopper spreader;

a trailer hitch adapter carried by said second beam, located intermediate first and second ends of said second beam, said trailer hitch adapter sized to be received by the trailer hitch of the vehicle;

first and second stabilizer assemblies carried by said second beam, said first and second stabilizer assemblies located on opposite sides of said trailer hitch adapter, said stabilizer assemblies each including a base member for mounting to said second beam, at least one stabilizing member cantilever mounted to said base member, and an adjustment mechanism coupling said at least one stabilizing member to said base member, said adjustment mechanism operable to pivot said at least one stabilizing member relative to said base member into engagement with an undersurface of a bumper of the vehicle for stabilizing the hopper spreader against pivoting movement about the trailer hitch when the hopper spreader is mounted on the vehicle.

17. The mounting assembly according to claim 16, wherein said adjustment mechanism includes a rod-shaped member for pivoting said stabilizing member relative to said base member.

18. The mounting assembly according to claim 17, wherein said stabilizing member includes a cushioning material on said upper surfaces of said sides.

19. The mounting assembly according to claim 16, wherein said stabilizing member includes first and second parallel arms each having an upper surface, said pivot extending through openings in said first and second arms.

20. The mounting assembly according to claim 16, wherein said first and second beams are pivotably interconnected at first and second ends by first and second pivot members, allowing said first beam to be pivoted relative to said second beam, about either end.

* * * * *

UNITED STATES PATENT AND TRADEMARK OFFICE
CERTIFICATE OF CORRECTION

| | |
|---|---|
| PATENT NO. | : 7,431,227 B2 |
| APPLICATION NO. | : 11/144336 |
| DATED | : October 7, 2008 |
| INVENTOR(S) | : Robert N. Gamble, II, Lynn W. Schultz and Terry C. Wendorff |

It is certified that error appears in the above-identified patent and that said Letters Patent is hereby corrected as shown below:

Col. 8, Line 49 "The mounting assembly for a according to claim 7" should be
-- The mounting assembly according to claim 7 --

Signed and Sealed this

Second Day of December, 2008

JON W. DUDAS
*Director of the United States Patent and Trademark Office*